Oct. 20, 1970     D. E. BARTHLOME     3,534,406
EQUIPOTENTIAL SPACE SUIT
Filed Oct. 24, 1968     3 Sheets-Sheet 1

INVENTOR.
DONALD E. BARTHLOME
BY
*J. H. McCoy*
*Wallace J. Nelson*
ATTORNEYS

Oct. 20, 1970   D. E. BARTHLOME   3,534,406
EQUIPOTENTIAL SPACE SUIT
Filed Oct. 24, 1968   3 Sheets-Sheet 2

INVENTOR.
DONALD E. BARTHLOME
BY
ATTORNEYS

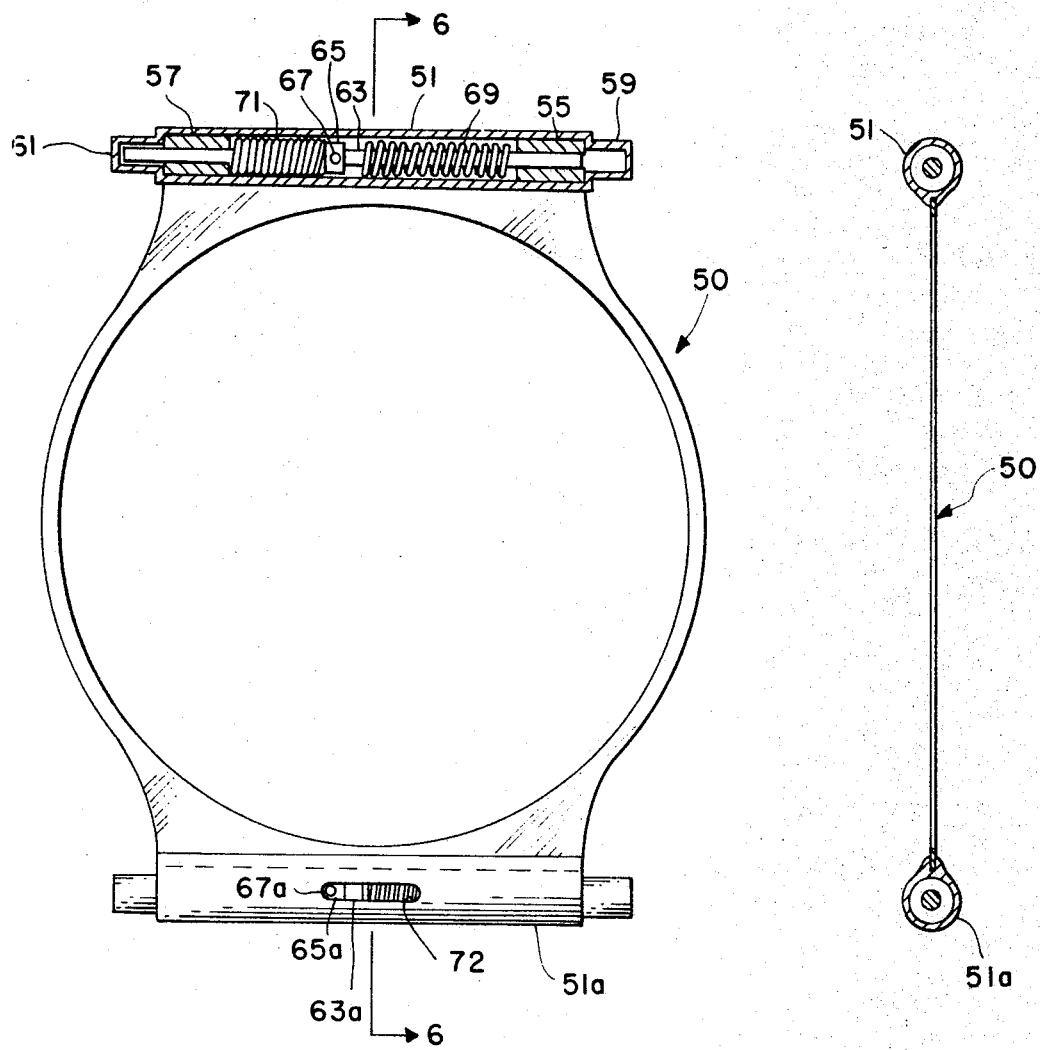

United States Patent Office 3,534,406
Patented Oct. 20, 1970

3,534,406
EQUIPOTENTIAL SPACE SUIT
Donald E. Barthlome, Hampton, Va., assignor to the United States of America as represented by the Administrator of the National Aeronautics and Space Administration
Filed Oct. 24, 1968, Ser. No. 770,203
Int. Cl. B63c 11/04
U.S. Cl. 2—2.1
10 Claims

ABSTRACT OF THE DISCLOSURE

In combination with an inflatable space suit having separable sections joined together, the improvement therewith comprising joint assist mechanisms at all movable joints of the suit and serving to assist in joint movement in such manner that the affected joint and all its components would be in a state of neutral equilibrium regardless of the angle of bend of the joint.

---

This invention was made by an employee of the National Aeronautics and Space Administration and may be manufactured and used by or for the Government of the United States of America without the payment of any royalties thereon or therefor.

This invention relates generally to a full pressure suit and relates more particularly to the combination of a pressurized space suit with a plurality of joint assist mechanisms disposed exterior of the suit and at each movable joint to assist in joint movement by the suit occupant and performing in a manner that the joint being moved or bent and all its components remain in a state of near-neutral equilibrium regardless of the angle of bend of the joint. The expression "near-neutral equilibrium" is used instead of neutral equilibrium to indicate that the system is real and therefore contains some friction.

The present state of the art in space suit design requires that all joints be constructed such that mobility will not be impaired by fluctuations in the pressure of the contained inflation gas. Joints of this nature are simply termed constant volume joints. Their effect is the elimination of all pressure-volume work during flexure of the space suit, such for example, as encountered when walking or doing other work requiring the bending of his limbs during extravehicular activity (EVA) of an astronaut or space explorer.

At the present time, space suit joints must satisfy volumetric requirements and, in addition, possess structural characteristics such that a minimum of effort is involved in flexing the pressurized joint. However, the requirement that all joints in a space suit be of constant volume presents an expensive and formidable engineering design problem and the elimination of constant volume as a design criteria would permit greater latitude when designing space suit joints for increased structural mobility.

Since the advent of the space age, many space suits and space suit design concepts have evolved. None, however, other than exoskeletal types has provided the astronaut with a supplemental energy source to aid in manipulating the joints of the space suit. It is believed that the lack of this element has retarded the development of the desirable state of the art in space suits, thereby seriously limiting the efficiency of the astronauts.

Considerable advances have been made to date in the area of space suit design. However, existing suits are still deficient in the basic areas of mobility, pressurization levels, and reliability of construction. It is believed that these basic deficiencies will continue to plague the space program as long as the astronaut must supply all the energy required to flex the joints in the suit.

At the present time investigations are underway in an attempt to devise a mechanical method for flexing the space suit joints. This approach is directed toward an exoskeletal mechanism. However, the device requires that a source of electrical energy accompany the astronaut at all times. Further, it is quite bulky and would involve considerable weight. The prime deficiency appears to lie in the extreme complexity of the mechanism which will necessitate attention and maintenance. This requirement could prove to be unsatisfactory for operations in remote regions such as the moon's surface.

The equipotential space suit of the present invention brings within the realm of possibility the construction of a space suit utilizing simple spring type mechanical aids, termed joint assists, which minimize the energy requirements imposed upon the astronaut, and contains joints which possess reliable construction features permitting pressurization well within the region associated with a two gas system. Thus, by the combination of restraint mechanism which produces forces and moments that tend to bend the joints to a maximum configuration and spring biased pistons producing forces and moments equal and opposite to that produced by the restraining mechanism a system is produced that is in a state of near equilibrium at all times to permit joint flexure with a minimum of effort on the part of the suit occupant.

The importance of the equipotential space suit of the present invention, from an energy point of view, can best be demonstrated through the use of a simple analogy. Let it be assumed that the work required to flex a pressurized space suit joint can be represented by the raising and lowering of a given weight. As the weight is elevated to its maximum height, the astronaut would supply, at a minimum, an amount of energy equal to the product of the magnitude of the weight and the vertical height to which it is raised. Upon lowering the weight, this energy would be returned to the astronaut. However, since the muscles and tendons of the body are inelastic all the energy would be dissipated and, therefore, unavailable for further use. The weight, taken by itself, does not constitute a constant potential system because its potential energy varies from zero, at the point of reference, to some maximum value.

In an effort to minimize the energy required to repeatedly raise and lower the weight, let one end of a cord, suspended from an overhead pulley, be attached to a given weight while the other end is attached to a counterweight. For this system, that is, the weights, the cords and the pulley, the total potential energy is constant, independent of the position of the given weight and equal in magnitude to the potential energy provided the counterweight when it was attached to the cord. It must be assumed that the given weight is located at the reference point or point of zero potential energy at the time the counterweight is attached. Consequently, the weights are in a state of mutual equilibrium and the astronaut need only supply energy associated with inertia and friction. It is now apparent that any increase in the given weight needed to optimize the space suit joints, as for example, an increase in the structural integrity of the joints or an increase in suit pressure, could be offset by a comparable increase in the counterweight.

These procedures outline, at least in principle, the advantages to be derived through the use of the equipotential space suit of the present invention. Application of this concept to a space suit joint does not, however, involve the use of potential energy of position as in the above analogy, it utilizes the elasticity or elastic potential energy characteristic of most engineering materials.

Accordingly, it is an object of the present invention to provide an equipotential inflatable space suit which minimizes the energy required by an astronaut to bend his limbs during extravehicular activity when wearing the inflated space suit.

Another object of the present invention is the use of novel joint assist mechanisms for each movable joint in an inflatable space suit to assist the suit occupant in all joint movement.

Another object of the present invention is anequipotential space suit serving to minimize pressure-volume work required in flexure of the space suit joints.

Another object of the present invention is an equipotential space suit which eliminates the requirement of constant volume as a design criteria for designing space suit joints.

Another object of the present invention is an equipotential space suit wherein the suit joints remain in a state of near equilibrium at all times and the ease with which joint flexure is obtained is present regardless of the direction in which the joint is bent.

The foregoing and other objects are attainable in one aspect of the present invention by providing a space suit having exteriorly disposed variable restraint cables to prevent undue joint expansion and to assist in the work required by the suit occupant in flexing each joint. These restraint cables are disposed one each on opposite sides of the individual joints and secure to the exterior of the spaec suit by way of suitable retaining rings. The retaining rings are positioned between alternate convolutes of the space suit joint with a housing secured on opposite sides thereof for receiving and permitting restraint cable movement as the joint is flexed by the suit occupant. Two of the retaining rings for each joint, i.e., one at each end, serve to secure the restraint cable ends for that joint. Each of the housings for these rings and the other retaining rings contains a movable piston having a raised collar intermediate the ends thereof with a pair of coil springs disposed on opposite sides of the collar and having the opposite end thereof abutting against a linear ball bearing adapted to slidably receive the movable piston. The restraining cables are received through an elongated opening in each of the housings and pass through each of the collars on the respective pistons. Thus, when a joint is flexed by the suit occupant the restraint cables will exert a force on the piston collar causing the piston to move against the action of one of the coil springs and in the direction of joint flexing. When the suit occupant relaxes or removes the flexing force, this compressed coil spring will exert an opposite force on the piston collar to assist in returning the restraining cable and consequently the flexed joint to its original position.

An additional mechanism is provided for assisting in movement of the hip joint during walking and the like and includes a substantially inverted V-shaped housing having a pair of movable pistons therein with each piston being under the influence of a coil spring. A fixed pin extends from a bracket on the suit body and is received by this housing at the peak of the inverted V so as to engage each of the pistons therein. During walking or other movement of the hip joint, this pin pivots within the housing while also translating along the housing longitudinal axis to exert a force on one of the contained pistons and cause compression of the piston coil spring. When the force causing flexure of the joint is removed the compressed spring will exert a force on the pivot pin to assist in moving of the joint to its original position.

A more complete apprecation of the invention and many of the attendant advantages thereof will be readily apparent as the same becomes better understood by reference to the following detailed description when considered in connection with the accompanying drawings wherein:

FIG. 5 is a part-sectional view of a single metal retaining ring and taken along line 5—5 of FIG. 4;

FIG. 6 is a view of the metal retaining ring shown in FIG. 5 and taken along line 6—6 thereof.

Figure 2:
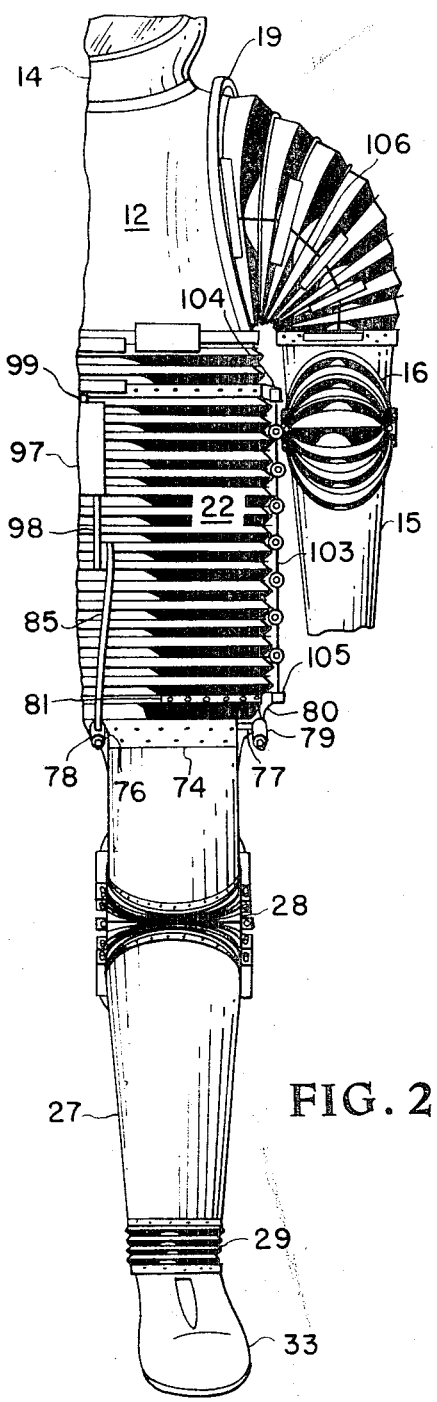
FIG. 2 is a half-front view of the space suit shown in FIG. 1.
Figure 1:
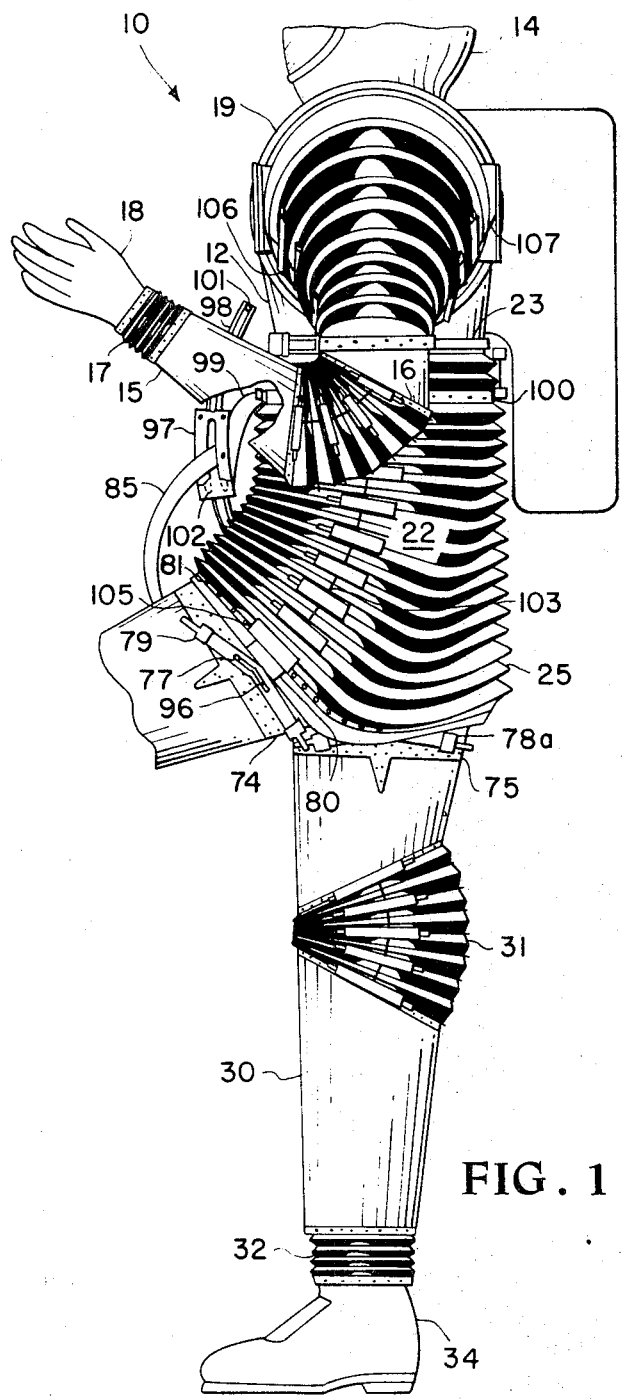
FIG. 1 is a side view of a space suit utilizing various joint assist units according to the present inventon and with parts omitted for clarity.

Referring now more particularly to the drawings wherein like reference numerals designate identical or corresponding parts throughout the several views and more particularly to FIGS. 1 and 2, there is shown a space suit generally designated by reference numeral 10. Space suit 10 includes a rigid vest section 12 serving to cover the upper torso of a suit occupant; an airtight helmet 14 secured to vest 12 by a suitable rotatable seal, not shown; a pair of arm sections, one of which is shown in FIG. 1 and designated by reference numeral 15 and secured to vest 12 by rotatable seal 19; and, a lower body section 22 secured to the lower end of vest 12 by a positive rotatable seal joint 23. Arm 15 includes elbow joint 16, wrist section 17 and glove 18. The other arm not shown in this figure is of identical construction. Lower body section 22 includes a flexible hip encircling portion 25 and a pair of leg sections designated by reference numerals 27 and 30. Leg 27 is provided with a flexible knee 28 and an ankle segment 29 while the knee and ankle of leg 30 are designated, respectively, by reference numerals 31 and 32. A pair of suitable inflatable boots 33 and 34, respectively, are provided at the end of leg sections 27 and 30.

Figure 3:
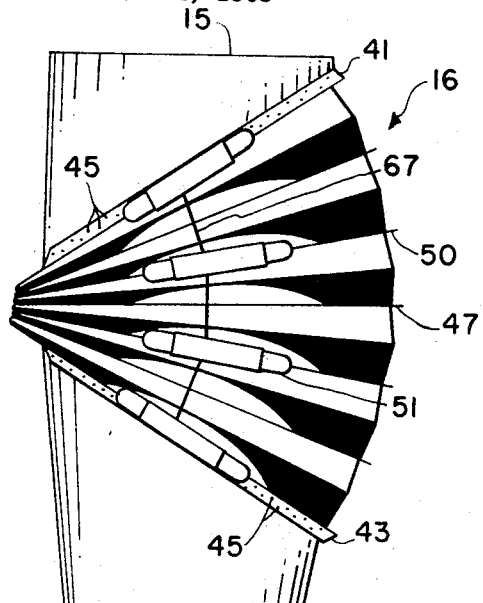
FIG. 3 is a view of a typical (elbow) joint of the space suit of the present invention in the straight or undeflected condition.
Figure 4:
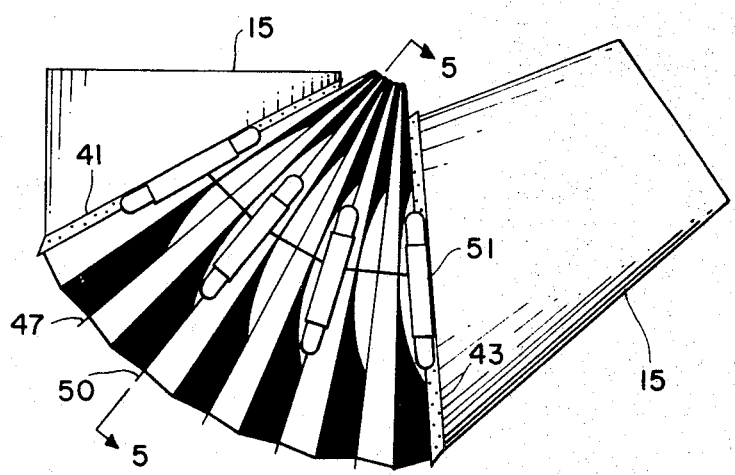
FIG. 4 is a view of the joint shown in FIG. 3 in the deflected condition.

The unique variable restraint joint assist mechanisms of the present invention are shown more clearly in FIGS. 3 and 4 in combination with elbow joint 16. As shown therein, joint 16 includes a plurality of convolutes attached to the upper portion of arm 15 by a rigid circular band or bracket 41 and to the lower part of arm 15 by a similar circular band or bracket 43. Brackets 41 and 43 are secured to arm 15 by rivets 45 or other suitable and conventional connection. A metal ring is disposed between each of the convolutes in joint 16. These metal rings are of two different types and alternately disposed along the length of the joint with the two types of metal rings being designated, respectively, by reference numerals 47 and 50. Rings 47 serve essentially only as reinforcement for the joint while rings 50 carry structure serving as joint assist mechanism.

Referring now more particularly to FIGS. 5 and 6 the details of one ring member 50 will now be described. As shown therein, ring 50 is provided with a pair of identical diametrically opposed tubular housings 51 and 51a of identical construction and integrally secured thereto. As shown in housing 51, linear ball bearings, designated by reference numerals 55 and 57, are disposed at opposite ends of the housing and retained therein by suitable end closures designated, respectively, by reference numerals 59 and 61. End enclosures 59 and 61 may be welded, riveted or otherwise conventionally attached to the housing. An elongated piston shaft 63 extends along the length of housing 51 with the ends thereof being received by the linear ball bearings 55 and 57. A raised collar or piston head 65 is provided intermediate the length of shaft 63 and slidably receives the joint restraint cable 67 therethrough. A pair of coil springs are positioned between the faces of piston head 65 and linear ball bearings 55 and 57 as designated, respectively, by reference numerals 69 and 71. Springs 69 and 71 are both slightly compressed and serve to maintain piston head 65 and restraint cable 67 intermediate the housing when joint 16 is deflected to a point intermediate the undeflected or straight condition as shown in FIG. 3 and the maximum deflection shown in FIG. 4. When joint 16 is deflected as in FIG. 4, piston head 65 and shaft 63 will translate or move to one side (to the left as shown in FIG. 5) to thereby further compress spring 71 due to the compressing action of restraint cable 67 thereagainst. This translating movement of restraint cable 67 relieves the compression on spring 69 and is permitted due to elongated openings appearing in each side of the respective tubular housings one of which is shown in housing 51a and designated by reference numeral 72. As mentioned hereinabove housings 51 and 51a are of identical construction and piston 63a, piston head 65a, restraint cable 67a and coil spring 69a are visible through opening 72 shown for housing 51a.

Referring now back to FIGS. 3 and 4, it is readily apparent that restraint cables 67 and 67a (not visible in these figures) execute movement in the direction of joint flexure during bending of the joint. This is partially due to the hereinbefore described structure and function of the joint assist housings on rings 50. As also apparent from FIGS. 3 and 4, the ends of the convolutes making up joint 16 terminate in rings 50. These end rings are identical in construction to that described hereinbefore but function differently in that the ends of restraint cables 67 and 67a are secured to the piston head in these ring housings instead of passing completely through the housings. In addition, these end rings are secured, by welding or other convention connection, to circular brackets 41 and 43, respectively.

The operation of the variable restraint equipotential space suit joint is now believed apparent from the above description of exemplary joint 16, it being understood that the knee joints 28 and 31, as well as the other elbow joint, are of essentially identical construction. Thus, when the suit occupant maintains the joint in straight condition (FIG. 3) the joint convolutes will be completely compressed at the base of the elbow and completely expanded at the forearm side. This initial positioning of the convolutes doubles the total angle of bend available from any one convolute. As the suit occupant initiates bending of the joint, the compressed springs 69 and 69a will cause motion of piston heads 65 and 65a which in turn cause translation of the restraint cables 67 and 67a to the right as shown in FIG. 3 or to the left as shown in FIG. 5. During this process the axial length of the joint will decrease slightly. At some angle of bend short of the intermediate configuration between FIG. 3 and FIG. 4 contact will be made between the piston heads 65 and 65a and the undeflected springs 71 and 71a (not shown). At the intermediate configuration the axial length of the joint will be a minimum equal to the length of the restraint cables with all springs being in contact with their negative piston heads 65 and 65a and compressed to some degree. During the process of bending the joint from the intermediate to the position of maximum deflection (FIG. 4) springs 69 and 69a will be relieved of compression. When deflection as shown in FIG. 4 is reached, the axial length of joint 16 will again be at a maximum and equal to the value it had when in the undeflected position shown in FIG. 3. The volume of the joint will also be again at a maximum.

Figure 7:
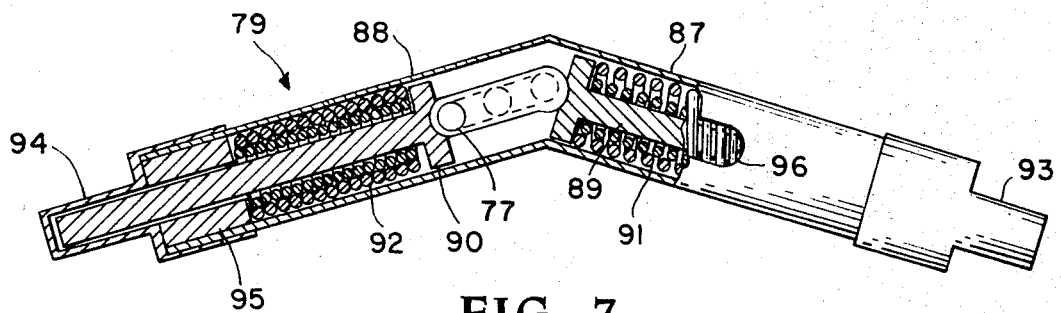
FIG. 7 is a part sectional view of one of the joint assist mechanisms for the hip joint.

Referring now to FIGS. 1, 2 and 7, the joint assist mechanism for movement of the hip joint will now be described. As shown in FIGS. 1 and 2 legs 27 and 30 are provided with substantially circular brackets riveted or otherwise conventionally secured to the upper thigh portions of the pressure suit and as designated respectively by reference numerals 74 and 75. These brackets each support an internal and external integral pivot pin designated by reference numerals 76 and 77, respectively, for bracket 74 and, not shown, for bracket 75. Pins 76 and 77 are each adapted to extend through a joint assist housing designated, respectively, by reference numerals 78 and 79. Housing 79 is supported by bracket 80 which in turn is integral with a body encircling band 81 riveted or otherwise conventionally secured to flexible hip encircling portion 25. Housing 78 on the inside of leg 27 is supported by an arcuate bracket 85 as will be further explained hereinafter.

Referring now more particularly to FIG. 7, it is seen that housing 79 is formed of two tubular sections 87 and 88 angularly connected together, as by welding or the like. Each tubular section 87 and 88 are of identical construction and contain, respectively, slidable pistons 89 and 90 biased toward the angular connection of tubular sections 87 and 88 by respective double coil springs 91 and 92. Tubular sections 87 and 88 are closed, respectively, by end caps 93 and 94 each of which is provided with a reduced diameter extension for receiving the end of the respective pistons as will be further explained hereinafter. End caps 93 and 94 may be threaded, welded or otherwise conventionally attached to the tubular sections and with end cap 94 serving to maintain linear ball bearing 95 in position to slidably receive piston 90 and end cap 93 securing a similar linear ball bearing, not shown, in position within tubular section 87 for receiving piston 89. Pivot pin 77 extending from bracket 74 extends through joint assist housing 79 by way of angular disposed opening 96 (FIG. 1).

Thus, when the suit occupant moves his legs as in a walking motion as shown in FIG. 1, and since the joint assist housing is positioned beneath or away from the hip pivoting joint, the pivot pins 76 and 77 will be translated forward of the joint assist housings which remains relatively stationary with lower body section 22 of the space suit. Pivot pins 76 and 77 are supported by suitable needle bearings, not shown, which bear against the respective tubular housings through which the pivot pins extend. As the pins 76 and 77 are translated forward with the movement of the leg 27 they also pivot slightly and pin 77 moves along angular opening 96 in housing 79 causing piston 90 to compress spring 92. Pin 76 acts simultaneously against a like piston in housing 78. Suitable conventional roller bearings are provided on the ends of pivot pins 76 and 77 and serve as the actual contact for the respective piston. When the suit occupant removes the stepping or bending force on leg 30, as by stepping with the other leg (30), the stored energy in compressed spring 92 and a like spring in housing 78 will be released to assist in straightening the leg 27 by directing a force on the respective piston and pivot pins 76 and 77, thus resulting in a joint assist mechanism. A similar but opopsite movement of pins 76 and 77 occurs when the leg is extended in back of the torso as in striding in normal or long steps. Thus, when leg 27 is displaced aft of the torso, pivot pin 77 would be cammed against piston 89 to compress spring 91 and when the leg is again moved toward its normal position beneath the torso spring 91 would exert a force on piston 89 to assist in this movement.

It is to be understood that the energy required to compress springs 91 and 92 and the like springs in the remaining joint assist housings, and to deform the elastic material of the joint as it is moved would not be provided by the suit occupant. This energy is supplied in the form of pressure-volume energy by the expanding gas inside the suit as the volume of the joint increases during translation of pins 76 and 77. In the event volume changes in this joint, in combination with volume changes in other joints in the suit, produce pressure fluctuations of a magnitude intolerable to the occupant, the Space Suit Pressure Stabilizer System as disclosed in applicant's copending application Ser. No. 757,861 filed Sept. 6, 1968 (NASA Case 5332) could be incorporated as an integral part of the suit in the present invention.

As mentioned hereinbefore, housing 78 is supported in position by arcuate bracket 85 which terminates with an inturned flange integral with arcuate track 98. Arcuate track 98 is formed in the arc of a circle whose center is common to the center of rotation of assist housing 78 and 79 and is slidably received by bearing housing 97. Bearing housing 97 is rigidly attached to a bracket 99 extending from circular band 100 that passes around and is rigidly attached to a bracket 99 extending from circular band 100 that passes around and is rigidly attached to the suit torso. An opening is provided along bearing housing 97 to permit movement of arcuate bracket 85 as it moves with arcuate track 98 with suitable needle bearings 102 within housing 97 serving to reduce the friction between arcuate track 98 and bearing housing 97 while still providing positive support for joint assist housing 78. A stop pin 101 is provided transversely through the end of arcuate track 98 and serves to engage an indentation (not designated) in bearing housing 97 to prevent arcuate track 98 from moving past bearing housing 97 when leg 27 is straightened.

The waist and hip joint restraint assembly (85, 97, 98, 99, 100) provides positive support for assist housing 78 as leg 27 is raised as in walking, climbing or sitting. An identical assembly, not shown, is provided for support of assist housing 78a on leg 30 with bracket 99 and circular band 100 being common to both assemblies. These assemblies act independent of each other and serve to eliminate the need for restraint cables on the central portion of the front and rear of suit portion 25.

The hip joint is also provided with a pair of joint restraint cables, one of which is shown and designated by reference numeral 103. Cable 103 and its counterpart, not shown, are attached via appropriate assist housings, not desgnated, to circular band 100 and body encircling band 81 via fixed assist housings rigidly attached to the respective bands and designated, respectively, by reference numerals 104 and 105. The operation of this joint assist is essentially the same as that described hereinbefore with the exception that assist movement is provided only in one direction with each assist housing containing only a single spring assist. Joint restraint cable 103 and the other, not shown, but disposed on the opposite side of the lower body section 22 of space suit 10, functions in a similar manner to that described hereinbefore in regard to joint restraint cable 67 and 67a in joint 16. Also a similar pair of joint restraint cables, as designated by reference numerals 106 and 107, and suitable assist housings, not designated, are provided on the space suit shoulder joint and function in a similar manner and need not be further elaborated on.

It is thus seen that the equipotential space suit of the present invention has a number of advantageous features not heretofore possible in pressurized space suits. For example, the use of soft material for the space suit limbs results in a more comfortable suit and one that requires less storage space than the conventional rigid limbed suit. Additionally, the suit of the present invention has joints requiring torques substantially less than any existing space suit of the pressurized type and is a suit that can be pressurized in a conventional manner to the earth's atmospheric pressure and still maintain bending torques substantially less than any existing space suit of the pressurized type. Additionally, the present invention provides a suit having joints possessing a degree of strength and toughness unapproachable by the previous design of space suits and enables the space suit design engineer to contemplate joint designs that heretofore were totally impractical.

Although this invention has been described with reference to specific structure for the various variable restraint mechanisms, it is not to be considered as so limited and any suitable structure that produces forces and moments that are always equal but opposite to the forces and moments that resist joint bending is considered within this invention. Thus, the illustrated embodiment of the present invention is considered only the preferred structure for providing a system that is in a state of near-neutral equilibrium at all times in which the joint may be readily flexed with a minimum of effort. No specific material has been mentioned for the construction of space suit 10, it being understood that any conventional inflatable space suit material may be used to construct the inflatable suit according to the present invention with it being obvious where rigid and flexible construction are used. Accordingly, it is to be understood that the invention has been described in connection with a specific exemplary embodiment thereof and that this embodiment is given by way of illustration only and is not to serve as a limitation on applicant's invention. Accordingly, changes and modifications in details of the invention described herein can obviously be made by those skilled in the art without departing from the spirit and scope of the invention as defined in the appended claims. It is therefore to be understood that within the scope of the appended claims that the invention may be practiced otherwise than as specifically described.

What is claimed as new and desired to be secured by Letters Patent of the United States is:

1. In combination with a pressurized space suit, flexible joints for the knees and elbows of the space suit, each said flexible joint including:
   a plurality of flexible convolutes circumferentially disposed and extending the length of the joint,
   restraint cable means attached to each end of said joint to prevent undue joint expansion when the space suit is pressurized and acting in combination with the suit pressure to produce forces and moments within the joint tending to bend the joint to a maximum configuration,
   spring biased piston means acting against said restraint cable means and serving to produce forces and moments equal and opposite to that produced by the restraint cable means and pressure forces to provide a system that is in a state of near-equilibrium at all angles of bend of said joint to thereby permit joint flexure with a minimum of effort on the part of the suit occupant.

2. The combination of claim 1 including rigid reinforcing rings provided between each said flexible convolute in said joint.

3. The combination of claim 2 wherein alternate ones of said reinforcing rings are each provided with a pair of tubular housings disposed 180° apart and said restraint cable means includes a pair of restraint cables disposed 180° apart and extending diametrically through said tubular housings.

4. The combination of claim 3 wherein said spring biased piston means includes a piston shaft slidably received by each of said housings, each said piston shaft being provided with an intermediate raised collar and, spring means on opposite sides of each said collar biasing each said shaft to an intermediate position in said housing, said restraint cable means passing through each said collar and being bent at the point of collar contact in all positions other than when said joint is intermediate between straight and a maximum bend configuration.

5. The combination of claim 1 wherein the convolutes in said elbow joints are completely compressed at the base of the elbow and completely expanded at the forearm side when the joints are in the straight undeflected condition and the convolutes in said knee joints are completely compressed at the knee side and completely expanded at the aft side when the joints are in the straight undeflected condition to thereby double the total angle of bend available for any one convolute in the respective joints.

6. The combination of claim 1 including joint assist mechanism for assisting in leg and hip movement during climbing, sitting and walking action by the suit occupant, said joint assist mechanism including:
   a circular bracket rigidly attached to the upper thigh portion of the pressure suit torso,
   a pair of rigid pivot pins extending from each said circular bracket with one of said pair being adjacent the crotch region of the suit leg and the other of said pair being disposed 180° therefrom on the outside of the suit leg, each said pivot pin being received by a slotted joint assist housing, each said slotted joint assist housing being of a wide inverted V configuration and housing a pair of angularly disposed spring biased piston members, each said piston member being provided with an indentation for receiving said pivot pin, and being individually movable against the spring biasing force when said pivot pin moves against said piston.

7. The combination of claim 6 wherein said slotted joint assist housings on the outside of the suit leg are each supported by a bracket and each said bracket is integral with a body encircling band rigidly attached to the lower region of the suit torso.

8. The combination of claim 6 wherein said slotted joint assist housings adjacent the crotch region of the suit legs are supported by a pair of identical arcuate brackets, said arcuate brackets each being integral with an arcuate track, said arcuate tracks being slidably received by a bearing housing and movable along needle bearings disposed within said bearing housing, said bearing housing being integral with a support bracket and said support bracket being rigidly secured to a body encircling band rigid with said suit adjacent the waist portion thereof.

9. The combination of claim 6 wherein said arcuate tracks are formed in the arc of a circle whose center is common to the center of rotation of said slotted joint assist housings.

10. The combination of claim 6 including a first pair of fixed assist housings integral with said body encircling band that is attached to the lower region of the suit torso, said first pair of fixed assist housings each being adjacent one of said slotted joint assist housings on the outside of each suit leg, a second pair of fixed joint assist housings integral with said body encircling band adjacent the waist portion of said suit, and disposed 180° apart and on a vertical plane with said first pair of fixed assist housings when both legs of the suit are straight, cable restraint means extending from each of said first pair of fixed assist housings to each of said second pair of assist housings, a plurality of flexible convolutes formed in said suit and extending at least in the suit area between said body encircling bands, at least alternate ones of said convolutes being provided with circular reinforcing rings, each said circular reinforcing rings being provided with a pair of spring biased piston means integrally housed 180° apart and said cable restraint means and each said spring biased piston means acting with and against each other to produce counteracting forces and moments and thereby provide, in combination with said joint assist mechanism carried by said thigh portions of the suit legs, a system permitting leg and hip motion by the suit occupant requiring a minimum of effort.

References Cited

UNITED STATES PATENTS

| | | | |
|---|---|---|---|
| 2,410,632 | 11/1946 | Colley et al. | 2—2.1 |
| 2,433,768 | 12/1947 | Krupp | 2—2.1 |
| 3,034,131 | 5/1962 | Lent | 2—2.1 |
| 3,381,303 | 5/1968 | Hazard | 2—2.1 |

JORDAN FRANKLIN, Primary Examiner

G. H. KRIZMANICH, Assistant Examiner

U.S. Cl. X.R.

285—226